Figure 1:
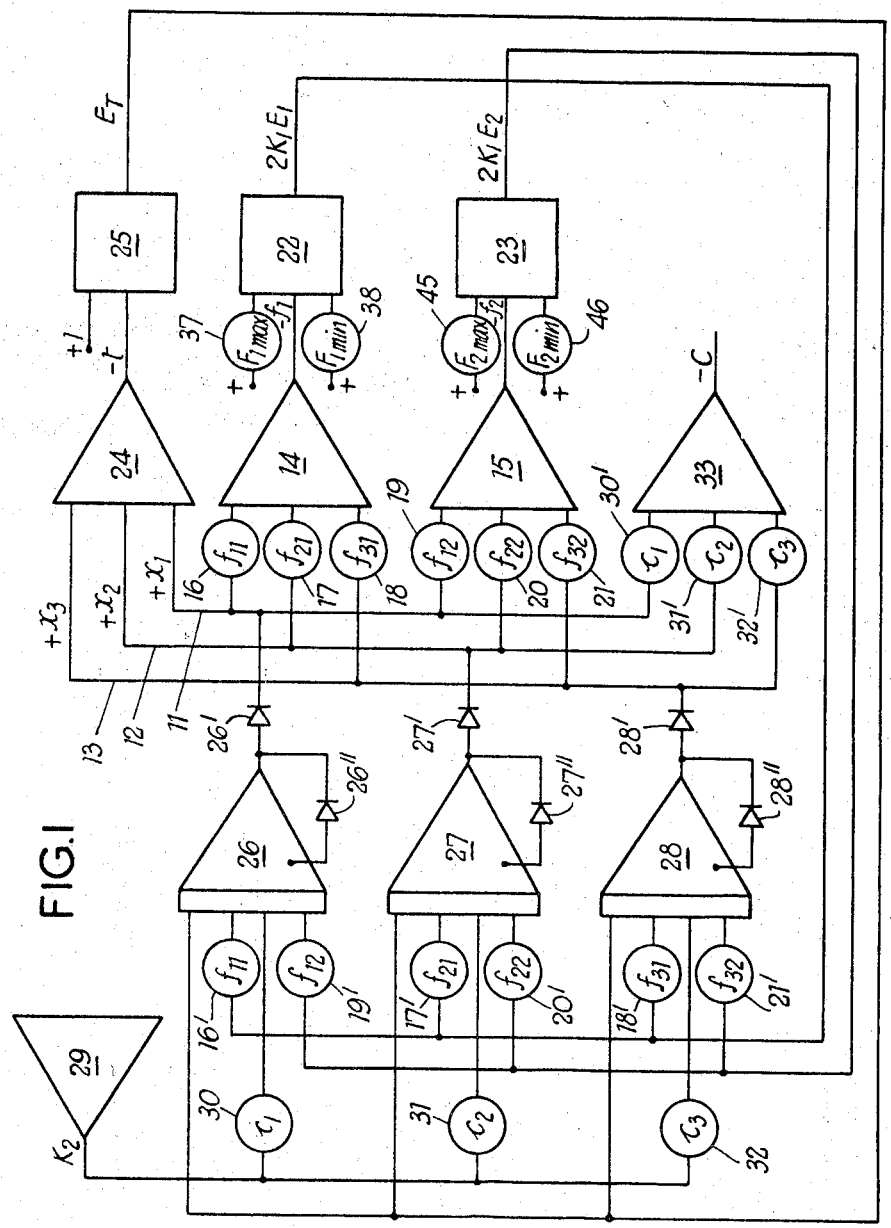

3,443,078
ANALOGUE COMPUTERS FOR LEAST-COST OPTIMIZATION
Leonardo Gastão Noronha, Hassocks, and Norman Derick Watling, Burgess Hill, England, assignors to Electronic Associates Inc., Long Branch, N.J., a corporation of New Jersey
Filed Sept. 16, 1966, Ser. No. 579,977
Claims priority, application Great Britain, Sept. 16, 1965, 39,660/65
Int. Cl. G06g 7/52
U.S. Cl. 235—193          16 Claims This invention relates to an analogue computer, and more particularly to a special purpose analogue computer adapted, when supplied with information as to the cost per unit weight of various ingredients from which a mixture is to be made and as to the percentages of various constituents present in those ingredients, to solve the problem of the proportions in which the ingredients should be mixed in order to provide, at minimum cost, a mixture in which the various constituents are present in percentages which lie within predetermined ranges as to the limits of which information is also supplied to the computer while it is being set up to solve the problem.

As an elementary illustration of this kind of problem, it might be required to compute the proportions in which maize, costing £24 per ton and containing 4% of oil and 2.5% of fibre, and wheat, costing £48 per ton and containing 1.7% of oil and 3% of fibre, must be mixed in order to produce, at minimum cost per ton, a mixture having an oil content of not more than 3% and not less than 2% and a fibre content of not less than 2.5%.

More generally, the problem may be stated thus:

If unit weight of a mixture contains ingredients $X_1$, $X_2 \ldots X_i \ldots X_m$ in amounts $x_1, x_2 \ldots x_i \ldots x_m$ respectively and unit weight of any one of the ingredients, $X_i$, contains constituents $F_1, F_2 \ldots F_j \ldots F_n$ in amounts $f_{i1}, f_{i2} \ldots f_{ij} \ldots f_{in}$ respectively, where some but not all of the amounts $x_i$, and similarly some but not all of the amounts $f_{ij}$, may be zero then $$x_1 + x_2 + \ldots x_m = 1 \quad \text{(i)}$$

$$x_1 f_{1j} + x_2 f_{2j} + \ldots x_m f_{mj} = f_j \quad \text{(ii)}$$

where $f_j$ is the total amount of constituent $F_j$ in unit weight of the mixture, and the materials cost per unit weight of the mixture is $$C = c_1 x_1 + c_2 x_2 + \ldots c_i x_i + \ldots c_m x_m \quad \text{(iii)}$$

where $c_i$ is the cost of unit weight of the ingredient $X_i$.

It is required to find the values of $x_1, x_2 \ldots x_m$ which will yield a minimum value of C, whilst maintaining the proportions of the constituents in the mixture within ranges expressed by the inequalities $$\left.\begin{array}{c} F_{1\,max} > f_1 > F_{1\,min} \\ F_{2\,max} > f_2 > F_{2\,min} \\ \cdot \quad \cdot \quad \cdot \\ \cdot \quad \cdot \quad \cdot \\ \cdot \quad \cdot \quad \cdot \\ F_{n\,max} > f_n > F_{n\,min} \end{array}\right\} \quad \text{(iv)}$$

The problem is solved using a modification of the "method of steepest descent," and as a first step a set of error equations are formulated, defining "errors" $E_j$ of the values of $f_1, f_2 \ldots f_n$ as follows:

$$\left\{\begin{array}{l} \text{For } f_1 < F_{1\,min}\cdot E_1 = E_{1\,min} = f_1 - F_{1\,min} \\ \text{For } F_{1\,max} > f_1 > F_{1\,min}\cdot E_1 = 0 \\ \text{For } f_1 > F_{1\,max}\cdot E_1 = E_{1\,max} = f_1 - F_{1\,max} \end{array}\right.$$

$$\left\{\begin{array}{l} \text{For } f_2 < F_{2\,min}\cdot E_2 = E_{2\,min} = f_2 - F_{2\,min} \\ \text{For } F_{2\,max} > f_2 > F_{2\,min}\cdot E_2 = 0 \\ \text{For } f_2 > F_{2\,max}\cdot E_2 = E_{2\,max} = f_2 - F_{2\,max} \end{array}\right.$$

$$\left\{\begin{array}{l} \text{For } f_n < F_{n\,min}\cdot E_n = E_{n\,min} = f_n - F_{n\,min} \\ \text{For } F_{n\,max} > f_n > F_{n\,min}\cdot E_n = 0 \\ \text{For } f_n > F_{n\,max}\cdot E_n = E_{n\,max} = f_n - F_{n\,max} \end{array}\right. \quad \text{(v)}$$

Next, a "criterion function" T is constructed, by putting $$T = K_1 \sum_{j=1}^{n} E_j^2 + K_2 C \quad \text{(vi)}$$

where $K_1$ and $K_2$ are constants. It will be seen from Equations v that in equation vi the term containing $K_1$ is zero when the mixture complies with the constraints iv, and that within the limits of these constraints T is minimised when C is minimised. Thus the solution of minimum C within these constraints may be achieved by solving for minimum T within the constraints.

Now $E_j$ is a function of $f_j$, and $f_j$ and C are functions of $x_1, x_2 \ldots x_m$, so that T is a function in $m$-dimensional space and the steepest descent path to the solution of minimum T must lie along the negative gradient of this criterion function in $m$-dimensional space. Thus for any ingredient $X_i$, $$\frac{dx_i}{dt} = -\nabla T$$

$$= -\frac{\partial T}{\partial x_i}$$

$$= -\frac{\partial}{\partial x_i}\left[K_1 \sum_{j=1}^{n} E_j^2 + K_2 C\right]$$

$$\frac{dx_i}{dt} = -2K_1 \sum_{j=1}^{n} E_j \cdot \frac{\partial E_j}{\partial x_i} - K_2 \frac{\partial C}{\partial x_i} \quad \text{(vii)}$$

From Equation iii, $$\frac{\partial C}{\partial x_i} = c_i$$

From Equations v, it may be seen that when $E_j \neq 0$, $$E_j = f_j - F_{j\,min} \text{ or } f_j - F_{j\,max}$$

so that, since $F_{j\,min}$ and $F_{j\,max}$ are constants, $$\frac{\partial E_j}{\partial x_i} = \frac{\partial f_j}{\partial x_i}$$

in either case.

But, from Equation ii, $$\frac{\partial f_j}{\partial x_i} = f_{ij}$$

Thus Equation vii can be rewritten $$\frac{dx_i}{dt} = -2K_1[E_1 \cdot f_{i1} + E_2 \cdot f_{i2} + \cdots E_n \cdot f_{in}] - K_2 \cdot c_i \quad (viii)$$

It will be observed that this equation, which controls the movement of an ingredient $x_i$, comprises a composite error term, contained in the square bracket, and a cost term, and that each of the terms within the square bracket contains a factor $E_j$ which is zero when the corresponding constituent $F_j$ is present in the mixture in a proportion $f_j$ which is within the permitted range. Thus the composite error term only contains terms corresponding to those constituents which are in violation of the limits imposed on their respective proportions in the mixture. Since the material costs are always positive, the cost term $-K_2 \cdot c_i$ is always negative and will always tend to decrease $x_i$. If only this term were operative, it would drive $x_i$ downwards to violate some minimum restriction on the constituents. However, such violation brings into operation the corresponding term of the composite error term, acting, in such a case, to increase $x_i$. The two terms together, with their mutually opposite effects, then act to cause $x_i$ to settle at a point just outside the permissible region; and if it is arranged that $K_1 \gg K_2$, the composite error term predominates and $x_i$ will reach a steady state at the boundary itself and thus sit on a constraint.

Because the problem is linear the hypersurface formed by the $m$ ingredients (i.e. an $m$-dimensional Euclidean space) is convex and there is, therefore, only one minimum, and theoretically only one solution to the least-cost optimisation problem within the constraints imposed. In practice, round-off errors in the computation means that two different solutions may give "minimum" costs differing only very slightly, and such almost-equal multiple solutions can be tolerated in practice.

It is an object of the invention to provide an analogue computer adapted to solve problems of the kind discussed above according to the foregoing principles.

According to the invention there is provided an analogue computer comprising a plurality of conductors each adapted to carry a voltage representing a respective variable to be computed, a plurality of summing amplifiers, including a last summing amplifier, each having an output point and a plurality of input points, a respective plurality of first coefficient-setting potentiometers associated with each of the said plurality of summing amplifiers, each of these first coefficient-setting potentiometers connecting a respective one of the said conductors to a respective one of the input points of the summing amplifier with which it is associated, a further summing amplifier having an output point and a plurality of input points each directly connected to a respective one of the said conductors, a first plurality of error units each having an output point, a first input point connected to the output point of a respective one except the said last of the said plurality of summing amplifiers, and at least one second input point, each said second input point having connected thereto means for applying thereto a limit-defining signal and the error unit being arranged to provide at its output point a signal proportional to the extent to which a signal applied to the said first input point thereof is beyond a limit defined by a limit-defining signal applied to any said second input point thereof, a further error unit having an output point, a first input point connected to the output point of the said further summing amplifier, and a second input point having connected thereto means for applying a constant-value signal thereto, the said further error unit being arranged to provide at its output point a signal proportional to the difference between signals applied respectively to its first and second input points, a constant voltage source, a plurality of summing integrators each having an output point connected to a respective one of the said conductors, a first input point connected to the output point of the said further error unit, and a plurality of other input points, and associated with each summing integrator, a respective plurality of second coefficient-setting potentiometers connecting the said other input points of that integrator respectively to the said constant voltage source and to the output point of each of the said first plurality of error units.

Figure 2:
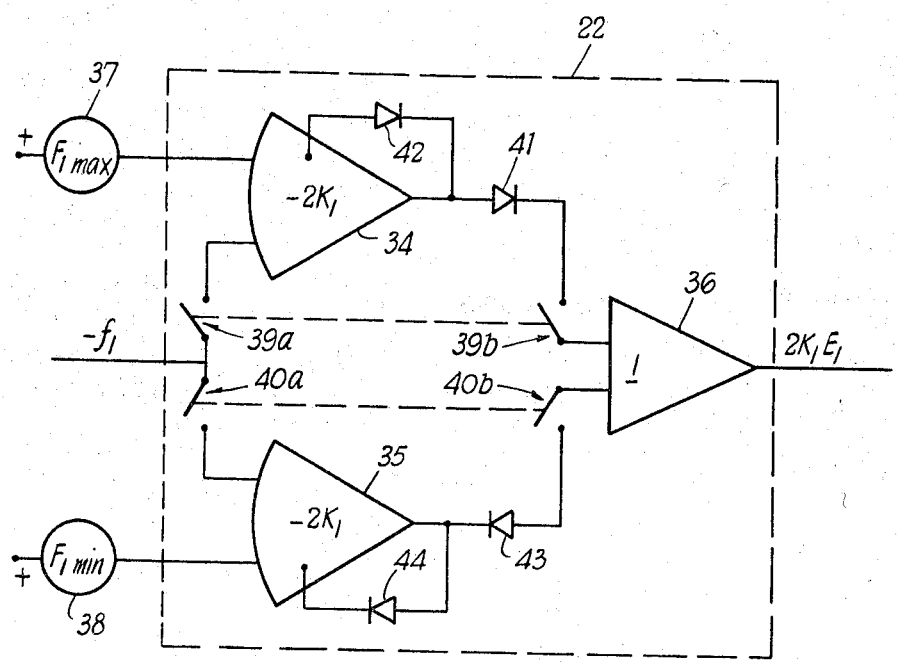
Figure 3:
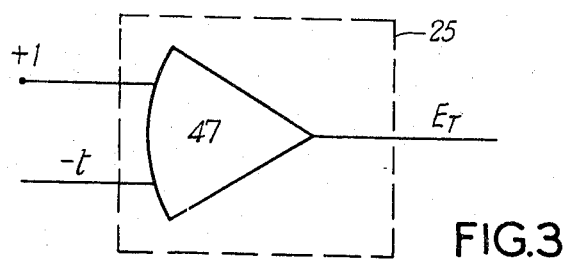
Figure 4:
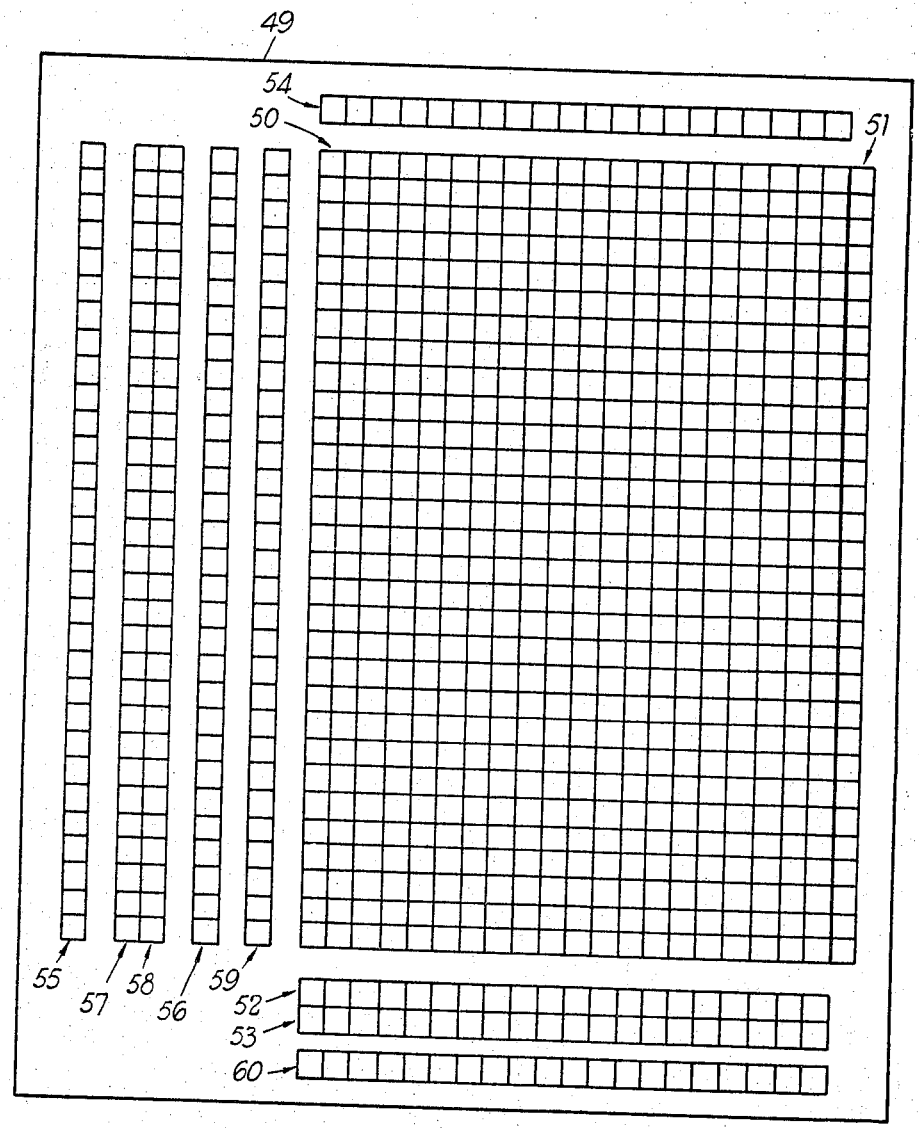

A preferred embodiment of a computer according to the invention is described below with reference to the accompanying drawings in which:

FIGURE 1 is a schematic diagram of the computer,

FIGURE 2 is a schematic diagram of an error unit comprised by the computer shown in FIGURE 1, FIGURE 3 is a schematic diagram of another error unit comprised by the computer shown in FIGURE 1, and FIGURE 4 is a diagrammatic front view of a console panel of a computer basically similar to that shown in FIGURE 1 but expanded to have a capability for solving problems which involve a greater number of input data and a greater number of unknowns to be computed.

As shown in FIGURE 1, the computer is adapted to determine the minimum-cost proportions $x_1$, $x_2$ and $x_3$ of three ingredients $X_1$, $X_2$ and $X_3$ of a mixture, subject to the constraints that in the mixture two constituents $F_1$ and $F_2$ are to be present in proportions $f_1$ and $f_2$ respectively where $f_1$ and $f_2$ are to fall within ranges defined by $$F_{1 \max} > f_1 > F_{1 \min}$$

$$F_{2 \max} > f_2 > F_{2 \min}$$

The cost per unit weight of the ingredients $X_1$, $X_2$ and $X_3$, and the proportions of the constituents $F_1$ and $F_2$ which they contain as established by laboratory analysis, may be tabulated thus:

|   | $F_1$ | $F_2$ | Cost |
|---|---|---|---|
| $X_1$ | $f_{11}$ | $f_{12}$ | $c_1$ |
| $X_2$ | $f_{21}$ | $f_{22}$ | $c_2$ |
| $X_3$ | $f_{31}$ | $f_{32}$ | $c_3$ |

The computer comprises three conductors 11, 12 and 13 which, let it be assumed, carry voltages $x_1$, $x_2$ and $x_3$ respectively representing the proportions in which the ingredients $X_1$, $X_2$ and $X_3$ occur in the mixture. Two summing amplifiers 14 and 15 are made to provide output signals $-f_1$ and $-f_2$ respectively representing the proportions of the constituents $F_1$ and $F_2$ in the mixture. To achieve this, the conductors 11, 12 and 13 are connected each through a respective co-efficient potentiometers 16, 17 or 18 to respective inputs of the amplifier 14 and through a respective co-efficient potentiometer 19, 20 or 21 to respective inputs of the amplifier 15; and these co-efficient potentiometers are set to multiply the variables $x_1$, $x_2$ and $x_3$ by the co-efficients $f_{11}$, $f_{21}$ and $f_{31}$ with which they are respectively labelled in FIGURE 1. Thus the total input to the amplifier 14 is $f_{11} \cdot x_1 + f_{21} \cdot x_2 + f_{31} \cdot x_3$ which is equal, apart from a difference in sign, to $-f_1$, the desired amplifier output; and similarly the amplifier 15 represents the equation $$f_2 = f_{12} \cdot x_1 + f_{22} \cdot x_2 + f_{32} \cdot x_3$$

The poteniometers 16 to 21, which in use are set to represent the proportions of the various constituents in the various ingredients, are referred to herein as "constituent matrix" potentiometers.

The output $-f_1$ from the amplifier 14 is applied as an input to an error unit 22 to which further inputs representing $F_{1 \max}$ and $F_{1 \min}$, the upper and lower limits of the permitted range for $f_1$, are applied; and the error unit, which is described in greater detail below with reference to FIGURE 2, provides an output signal $2K_1E_1$ representing the error $E_1$ as defined in Equation v. Similarly, the output $-f_2$ from the amplifier 15 is applied to a similar error unit 23, to which further inputs representing $F_{2\,max}$ and $F_{2\,min}$ are also applied and which provides an output signal $2K_1E_2$.

The voltages $x_1$, $x_2$ and $x_3$ are also applied as inputs to a third summing amplifier 24 which produces an output $-t$ where $t=x_1+x_2+x_3$. This output $-t$ is applied as an input to a "total mixture" error unit 25, described more fully below with reference to FIGURE 3, to which a fixed reference voltage is also applied and which provides an output $E_T$ representing the extent to which the instantaneous values of $x_1$, $x_2$ and $x_3$ fail to satisfy the condition $x_1+x_2+x_3=1$.

The computer also comprises three summing integrators 26, 27 and 28 having the conductors 11, 12 and 13 respectively connected thereto as output conductors carrying the voltages $x_1$, $x_2$ and $x_3$ as output voltages of the respective integrators. To ensure that negative values of $x_1$, $x_2$ and $x_3$ cannot be produced, since these voltages represent proportions of the ingredients $X_1$, $X_2$ and $X_3$ in the mixture and those proportions can never be negative, the output of the integrator 26 is connected to the conductor 11 through a diode 26' and through a diode 26'' to an input summing junction of the integrator 26; and the integrators 27 and 28 are similarly provided with diodes 27', 27'' and 28', 28''. These function in comparable manner to that described below, with reference to FIGURE 2, in connection with the error unit 22; and no detailed description with specific reference to the integrators will be required.

The integrator 26 has applied to its as inputs the voltage $E_T$ directly, the voltage $2K_1E_1$ through a potentiometer 16' set to multiply this voltage by a coefficient $f_{11}$, the voltage $2K_1E_2$ through a potentiometer 19' set to multiply this voltage by a coefficient $f_{12}$, and, from a voltage source constituted by an amplifier 29, a voltage $K_2$ representing the factor $K_2$ in Equation $viii$, this voltage being applied through a "cost" potentiometer 30 set to multiply it by a coefficient $c_1$. It will thus be seen that the integrator 26, with its input and output voltages, represents the equation:

$$x_1 = -\int(2K_1E_1f_{11} + 2K_1E_2f_{12} + K_2c_1)dt$$

or $$\frac{dx_1}{dt} = -2K_1[E_1f_{11} + E_2f_{12}] - K_2c_1$$

in accordance with Equation $viii$.

The voltage $K_2$ is similarly applied to the integrators 27 and 28 through cost potentiometers 31 and 32 set to provide multiplying coefficients $c_2$ and $c_3$ respectively. The voltage $E_T$ is also applied directly to each of the integrators 27 and 28. The voltage $2K_1E_1$ is applied to the integrators 27 and 28 through potentiometers 17' and 18' set to provide multiplying coefficients $f_{21}$ and $f_{31}$ respectively, and the voltage $2K_1E_2$ is similarly applied through potentiometers 20' and 21' set to provide multiplying coefficients $f_{22}$ and $f_{32}$ respectively. Thus the integrators 27 and 28 respectively represent the equations $$\frac{dx_2}{dt} = -2K_1[E_1f_{21} + E_2f_{22}] - K_2c_2$$

and $$\frac{dx_3}{dt} = -2K_1[E_1F_{31} + E_2f_{32}] - K_2c_3$$

in accordance with Equation $viii$.

The potentiometers 16' to 21', which in use are set to provide multiplying coefficients for the error signals $2K_1E_1$ and $2K_1E_2$ before these are applied to the integrators, are referred to herein as "error matrix" potentiometers.

The computer further comprises a summing amplifier 33 to which the voltages $x_1$, $x_2$ and $x_3$ are applied through respective cost potentiometers 30', 31', and 32' set to provide multiplying coefficients $c_1$, $c_2$ and $c_3$ respectively, so that this amplifier has as its output a voltage $-C$, where $C = x_1c_1 + x_2c_2 + x_3c_3$, representing the cost per unit weight of the mixture defined by $x_1$, $x_2$ and $x_3$.

Referring now to FIGURE 2, there is shown in greater detail the error unit 22. The error unit comprises two high-grain summing amplifiers 34 and 35 each with a gain of $-2K_1$, and a summing amplifier 36 with a gain of $+1$. A first input voltage representing $F_{1\,max}$, the upper limit for the proportion $f_1$ of constituent $F_1$ in the mixture, is applied to the amplifier 34 from a fixed positive-voltage reference terminal through a "constraint" potentiometer 37 set to provide the multiplying coefficient $F_{1\,max}$. A first input voltage representing $F_{1\,min}$ is similarly applied to the amplifier 35 by means of a constraint potentiometer 38 set to give $F_{1\,min}$. The voltage $-F_1$ from the amplifier 14 is applied as a second input to each of the amplifiers 34 and 35, by way of normally closed switches 39a and 40a respectively.

The amplifier 34 has its output connected through a diode 41, and a normally closed switch 39b, which is ganged to the switch 39a, to one input terminal of the amplifier 36; and the output of the amplifier 34 is also connected back, via a diode 42 to a summing junction of the amplifier. The arrangement is such that when $F_{1\,max}-f_1$ is negative (i.e. $f_1>F_{1\,max}$) the amplifier 34 has a positive output $2K_1(f_1-F_{1\,max})$ which is applied through the diode 41 to the amplifier 36, but that when $F_{1\,max}-f_1$ is positive (i.e. $f_1<F_{1\,max}$), so that the output of the amplifier 34 would be negative (and therefore blocked from the amplifier 36 by the diode 41), the output is in fact held virtually at zero since it is applied via the diode 42 to the summing junction where it counteracts the input voltages to the amplifier. Thus the amplifier 36 receives an input from the amplifier 34 only when $f_1>F_{1\,max}$, i.e. only when $f_1$ exceeds its maximum allowed value. The input from the amplifier 34 to amplifier 36 is then $-2K_1(F_{1\,max}-f_1)$ and this provides an output from the amplifier 36 of $2K_1(f_1-F_{1\,max})$, which is $2K_1E_1$ for the case $f_1>F_{1\,max}$ (see Equation $v$). Similarly, the output of the amplifier 35 is connected through a diode 43 and a normally closed switch 40b to a second input of the amplifier 36, and through a diode 44 to a summing junction of the amplifier 35. The diodes 43 and 44 are oppositely poled from the diodes 41 and 42, respectively, so that the amplifier 36 receives an input from the amplifier 35 only when $F_{1\,min}-f_1$ is positive (i.e. $f_1<F_{1\,min}$), the input to the amplifier 36 being then $-2K_1(F_{1\,min}-f_1)$ and the output of the amplifier 36 being then $2K_1(f_1-F_{1\,min})$ which is $2K_1E_1$ for the case $f_1<F_{1\,min}$ (see Equation $v$). When $F_{1\,max}>f_1>F_{1\,min}$, neither of the amplifiers 34 and 35 provides an input for the amplifier 36, which thus then has zero output, i.e. $E_1=0$ for the case $F_{1\,max}>f_1>F_{1\,min}$.

Thus the error unit 22, in association with the constraint potentiometers 37 and 38, provides an error signal $2K_1E_1$ where $E_1$ is in accordance with Equation $v$ for all values of $f_1$; and similarly the error unit 23 (which is identical in form with the error unit 22 and will not require further description) in association with constraint potentiometers 45 and 46 (see FIGURE 1) by means of which the limits $F_{2\,max}$ and $F_{2\,min}$ for the constituent $f_2$ are set up, provides an error signal $2K_1E_2$ where $E_2$ is in accordance with Equation $v$ for all values of $f_2$. It will be understood that the error units 22 and 23 are each adapted to impose both an upper and a lower limit on the proportions $f_1$ and $f_2$ of the constituents $F_1$ and $F_2$ in the mixture but that if, say, no upper limit is to be imposed on the value of $f_1$ this freedom from constraint can be expressed either by setting the constraint potentiometer 37 to give an $F_{1\,max}$ value of unity or 100% or by opening the switches 39a and 39b so that the amplifier 34 is rendered inoperative. Similarly the lower limit constraint on $f_1$ can be removed by setting $F_{1\,min}$ to zero or by opening the switches 40a and 40b; and the error unit 23 makes similar provision in respect of $f_2$.

The error units 22 and 23 serve for the application of "inequality constraints" in the solution of a problem. The "total mixture" error unit 25, shown in FIGURE 3, serves, with the summing amplifier 24, to impose the "equality constraint" $x_1+x_2+x_3=1$. For this purpose, the unit 25 comprises a high gain amplifier 47 having applied, as a first input the signal $-t$ from the amplifier 24 and, as a second input, a fixed reference potential representing unity or 100%; and it provides an output $E_T$ which is proportional to $1-t$ and thus to the error by which $x_1+x_2+x_3$ is different from unity or 100%. When a constituent proportion $f_j$ is to be made the subject of an equality constraint (i.e. $f_j = F_{j\ \text{fixed}}$) instead of being allowed to take up any value within a specified range (i.e. $F_{j\ \text{max}} > f_j > F_{j\ \text{min}}$, which is an inequality constraint) this can be effected by suitably modifying the circuitry of an error unit 22 or 23, i.e. (referring to FIGURE 2), by opening the switches 40a and 40b and switching out the diodes 41 and 42, so that the error unit produces an output whenever the input is different from the value $F_{j\ \text{fixed}}$, set up on the potentiometer 37.

When the computer shown in FIGURE 1 is switched on, after its constituent potentiometers 16 to 21, error matrix potentiometers 16′ to 21′, cost potentiometers 30 to 32 and 30′ to 32′, and constraint potentiometers 37, 38, 45 and 46 have been correctly set to provide the coefficients appropriate to the problem to be solved, the various voltages such as $x_1$, $x_2$ and $x_3$ which appear will initially assume arbitrary values which do not constitute a solution of the problem; and the voltages $E_T$, $2K_1E_1$ and $2K_1E_2$ will not be zero. However, after a short settling-down period during which the various voltages vary with time, the computer reaches a steady state condition in which the error signals are close to zero and the steady voltages $x_1$, $x_2$, $x_3$, $f_1$ and $f_2$ represent the solution of the problem.

It will be appreciated from a consideration of FIGURE 1 that each of the coefficients $f_{ij}$ is set up on both a "constituent matrix" potentiometer and an "error matrix" potentiometer, e.g. $f_{11}$ is set up on the constituent matrix potentiometer 16 and on the error matrix potentiometer 16′, and the constituent matrix and error matrix potentiometers are therefore preferably ganged in pairs, as are the two sets of cost potentiometers 30 to 32 and 30′ to 32′. On the other hand, individual unganged constraint potentiometers are provided for setting up the constraint coefficients to be applied to the error units.

It will be further appreciated that although FIGURE 1 represents a computer for solving a problem involving three ingredients and two constituents of the mixture which are to be constrained to fall within specified ranges, the computer can be expanded to handle a larger number of ingredients and a larger number of constituents of which the proportions in the mixture are to be subject to constraint. A commercially useful computer in accordance with the invention may, for example, comprise thirty integrators like the integrator 26, each to produce an output representing the proportion in the mixture of a respective one of thirty ingredients; twenty-two amplifiers like the amplifier 14, two of these corresponding to the amplifiers 24 and 33 and the remaining twenty each being available to produce an output representing the proportion in the mixture of a respective one of twenty constituents; and twenty error units like the error unit 22, each connected to one of the twenty amplifiers. Such a computer would require to comprise in addition, twenty pairs of individual unganged constraint potentiometers like the potentiometers 37 and 38, i.e. one pair for each of the twenty error units; six hundred ganged pairs of constituent matrix and error matrix potentiometers like the potentiometers 16 and 16′ (since each of the thirty integrators would require to have associated with it twenty error matrix potentiometers and each of the twenty amplifiers corresponding to a constituent would require to have associated with it thirty constituent matrix potentiometers); and thirty more ganged pairs of cost potentiometers like the potentiometers 30 and 30′, since each integrator would require to have associated with it one cost potentiometer like the potentiometer 30 and the "total cost" amplifier corresponding to amplifier 33 would require to have associated with it thirty cost potentiometers like the potentiometer 30′.

Preferably, the six hundred constituent matrix potentiometers and the equal number of error coefficient potentiometers ganged therewith are disposed with their six hundred setting dials arranged on a console panel 49 in a block 50 of twenty columns and thirty rows, each column corresponding to a separate constituent and each row to a separate ingredient, as shown in FIGURE 4; and the thirty ganged pairs of cost potentiometers are arranged with their thirty setting dials in a further column 51 with each dial aligned with one of the thirty rows. The twenty pairs of constraint potentiometers are preferably disposed with their forty setting dials arranged on the panel in two further rows 52 and 53, one dial of each row being aligned with each of the twenty constituent columns; and the constituent columns and ingredient rows are preferably labelled by means of a row 54 of twenty constituent address modules and a column 55 of thirty ingredient address modules respectively.

Each of the integrators like the integrators 26, 27 and 28 in FIGURE 1, may be provided with means for fixing its output at a definite value, thus specifying that the mixture will include a correspondingly fixed proportion of the corresponding ingredient, and with means for setting, in the alternative, upper and lower limits to the value which its output may assume. The panel may then include a column 56 of thirty three-position switches each settable to "FREE," "RESTRICT" and "FIXED" and with a further two columns 57 and 58 each of thirty ingredient potentiometers, each potentiometer of the column 57 being settable to determine the integrator output or to provide a maximum limit for it when the corresponding switch is set at "FIXED" or "RESTRICT" respectively, and the corresponding potentiometer of the column 58 being settable to provide, in the "RESTRICT" setting of that switch, a minimum limit for the integrator output. The panel 49 preferably includes a column 59 of thirty "INCL/EXCL" switches each of which enables a corresponding ingredient to be excluded entirely from the mixture and which is arranged, when switched to allow inclusion of the ingredient, to cause the corresponding ingredient address module of the column 55 to be illuminated. The panel 49 preferably also includes a row 60 of "EQU/INEQU" switches each arranged to modify a respective unit like that shown in FIGURE 2, to provide either an equality constraint or an inequality constraint on a given constituent. The panel 49 is conveniently comprised by a console which houses all the integrators, amplifiers and error units of the computer as well as all the potentiometers.

Associated with the console is a control desk having a control panel which includes a digital voltmeter and an array of display press-button switches. One such switch is provided for each potentiometer dial in the block 50, columns 51, 57 and 58 and rows 52 and 53, and on being depressed connects the corresponding potentiometer to the voltmeter which is calibrated to display the potentiometer setting as a percentage. Additional display switches connect the digital voltmeter each to the output of a respective "ingredient" integrator (such as 26 in FIGURE 1) or "constituent" or "total cost" amplifier (such as 14 or 33 in FIGURE 1) to enable the $x_i$, $f_j$ and C values computed to be displayed. Preferably there is also associated with the console and the control panel a typewriter and means for actuating it to print out each reading of the digital voltmeter when the computer is switched to a "PRINT-OUT" mode. Preferably the computer is also provided with means, actuable after a solution to a problem has been computed, for scanning and printing out sequentially all the potentiometers representing input data and all the voltages $x_i$, $f_j$ and C, thereby to print out a complete statement of the problem and its solution. To this end, the constituent and ingredient address modules in the row 54 and column 55 preferably incorporate code circuits which are also scanned in the sequential printing out process and which cause the typewriter to print out, say, a four-letter representation (e.g. BARL for barley) of the constituent or ingredient which the respective module indicates.

If a computer according to the invention is to be of maximum usefulness, it is important that the potentiometers by means of which input data are fed into the computer should be set to represent such data as accurately as possible. Thus, where the setting is accomplished with the aid of a digital voltmeter giving a four-figure reading, it is desirable that the most significant figure should never be zero. Preferably, therefore, each potentiometer dial of the block 50, columns 51, 57 and 58 are rows 52 and 53 has associated with it a scale-changing switch which, when the corresponding potentiometer is to be set to a value representing less than 10%, disconnects the potentiometer from the input resistor which normally connects it to the amplifier, integrator or error unit with which it is associated and connects it instead through a resistor ten times as great, giving a scale reduction by ten of the voltage provided by the potentiometer. At the same time, the scale-changing switch causes the decimal point on the voltmeter to move one place to the left of its normal position. Thus, with the scale changing switch set for less than 10%, a reading 6.780 on the digital voltmeter actually corresponds to a potentiometer setting of 67.8%; but the increased input resistance to which the potentiometer is then connected provides the necessary reduction by a factor of ten of the voltage which is applied to the amplifier, integrator or error unit as the case may be. In addition to the scale-changing switches thus associated with each potentiometer dial individually, there may be provided a row of thirty scale-changing switches each associated with one column of the block 50 and serving to change the scale of all the potentiometers in that column. The appropriate one of these switches may be used, instead of or in conjunction with a plurality of the switches associated with individual potentiometers of the corresponding column, when an operator notices in setting up the computer to solve a problem that all constituent percentages in all of the ingredients for one constituent column are present therein in proportions of less than 10%.

Various other facilities may also be provided in the computer. For instance, it was assumed in the foregoing description of FIGURE 1 that, for example, the potentiometer 37 acted to multiply a fixed reference voltage by a coefficient $F_{1\,max}$ to give a fixed upper limit to the permitted range of $f_1$. But it may be of interest to know how the minimum cost C varies as the upper limit $F_{1\,max}$ is varied, and to permit this to be investigated the computer may be provided with a number of ramp-function generators which may be connected to supply slowly increasing or decreasing reference voltages for use instead of fixed reference voltages where appropriate.

Preferably a computer such as that of which the panel 49 is a part is constructed in plug-in modular form so that not only are modules which become defective are easily replaced but also a purchaser of such a computer need only purchase so many of each of the various kinds of module as will be required for solving the problems which he is likely to encounter, with the possibility of expanding the computer subsequently if necessary. Thus each of the integrators, amplifiers and error units will preferably be constructed as a separate module. The address modules indicating constituents and ingredients in the row 54 and column 55 have already been mentioned, and preferably these are separate modules one for each constituent or ingredient. The ganged-pairs of potentiometers arranged to form the block 50 are preferably arranged with six ganged pairs per module, as are also the ganged pairs of cost potentiometers in the column 51. The constraint potentiometers for the rows 52 and 53 are preferably provided in modules each containing one potentiometer for the row 52 and one for the row 53. The three-position switches for the column 56 are conveniently grouped in modules each comprising six such switches, and the two position switches for the column 59 are conveniently also grouped six per module. The columns 57 and 58 are conveniently made up of modules each containing twelve potentiometers, six each for the columns 57 and 58.

What we claim is:

1. an analogue computer comprising:
    a plurality of conductors each adapted to carry a voltage representing a respective variable to be computed,
    a plurality of summing amplifiers, including a last summing amplifier, each having an output point and a plurality of input points,
    a respective plurality of first coefficient-setting potentiometers associated with each of the said plurality of summing amplifiers, each of these first coefficient-setting potentiometers connecting a respective one of the said conductors to a respective one of the input points of the summing amplifier with which it is associated,
    a further summing amplifier having an output point and a plurality of input points each directly connected to a respective one of the said conductors,
    a first plurality of error units each having an output point, a first input point connected to the output point of a respective one except the said last of the said plurality of summing amplifiers, and at least one second input point, each said second input point having connected thereto means for applying thereto a limit-defining signal and the error unit being arranged to provide at its output point a signal proportional to the extent to which a signal applied to the said first input point thereof is beyond a limit defined by a limit-defining signal applied to any said second input point thereof,
    a further error unit having an output point, a first input point connected to the output point of the said further summing amplifier, and a second input point having connected thereto means for applying a constant-value signal thereto, the said further error unit being arranged to provide at its output point a signal proportional to the difference between signals applied respectively to its first and second input points,
    a constant voltage source,
    a plurality of summing integrators each having an output point connected to a respective one of the said conductors, a first input point connected to the output point of the said further error unit, and a plurality of other input points, and,
    associated with each summing integrator, a respective plurality of second coefficient-setting potentiometers connecting the said other input points of that integrator respectively to the said constant voltage source and to the output points of each of the said first plurality of error units.

2. A computer as claimed in claim 1, wherein, of the plurality of second coefficient potentiometers associated with a respective integrator, that which connects one of the said other input points thereof to the constant voltage source is ganged to that one of the plurality of first potentiometers associated with the said last summing amplifier which connects an input point thereof to the conductor to which the output point of the respective integrator is connected, and each of the others, connecting a respective one of the said other input points of that integrator to the output point of a respective one of the said plurality of error units, is ganged with that one, of the plurality of first potentiometers associated with that one of the plurality of summing amplifiers of which the output point is connected to the said first input point of the respective error unit, which connects an input point of that amplifier to that one of the conductors to which the output point of the respective integrator is connected.

3. A computer as claimed in claim 2, wherein at least one of the said plurality of integrators is provided with means for constraining the output signal appearing at its output point to assume a predetermined value or a value within predetermined limits.

4. A computer as claimed in claim 2, wherein each of the said plurality of error units has two said second input points and is arranged to provide at its output point a signal proportional to the extent to which a signal applied to its first input point exceeds a signal applied to one of the second input points or is less than a signal applied to the other of the second input points.

5. A computer as claimed in claim 4, wherein at least one of the said plurality of integrators is provided with means for constraining the output signal appearing at its output point to assume a predetermined value or a value within predetermined limits.

6. A computer as claimed in claim 4, wherein each of the said plurality of error units comprises a pair of high-gain summing amplifiers, each having an output point, and a third summing amplifier having an output point which constitutes the output point of the error unit and two input points connected through oppositely poled diodes each to the output point of a respective one of the high-gain amplifiers, each of the high-gain amplifiers having two input points of which one is connected to the said first input point of the error unit and the other is connected to a respective one of the two said second input points thereof.

7. A computer as claimed in claim 6, wherein at least one of the said plurality of integrators is provided with means for constraining the output signal appearing at its output point to assume a predetermined value or a value within predetermined limits.

8. A computer as claimed in claim 6, wherein each of the high-gain amplifiers of each of the said plurality of error units has the said one of its input points connected to the said first input point of the error unit, and its output point connected to the respective input point of the said third amplifier of the error unit, by means of a pair of ganged switches which can be opened to interrupt such connections.

9. A computer as claimed in claim 8, wherein at least one of the said plurality of integrators is provided with means for constraining the output signal appearing at its output point to assume a predetermined value or a value within predetermined limits.

10. A computer as claimed in claim 1, wherein each of the said plurality of error units has two said second input points and is arranged to provide at its output point a signal proportional to the extent to which a signal applied to its first input point exceeds a signal applied to one of the second input points or is less than a signal applied to the other of the second input points.

11. A computer as claimed in claim 10, wherein at least one of the said plurality of integrators is provided with means for constraining the ouput signal appearing at its output point to assume a predetermined value or a value within predetermined limits.

12. A computer as claimed in claim 10, wherein each of the said plurality of error units comprises a pair of high-gain summing amplifiers, each having an output point, and a third summing amplifier having an output point which constitutes the output point of the error unit and two input points connected through oppositely poled diodes each to the output point of a respective one of the high-gain amplifiers, each of the high-gain amplifiers having two input points of which one is connected to the said first input point of the error unit and the other is connected to a respective one of the two said second input points thereof.

13. A computer as claimed in claim 12, wherein at least one of the said plurality of integrators is provided with means for constraining the output signal appearing at its output point to assume a predetermined value or a value within predetermined limits.

14. A computer as claimed in claim 12, wherein each of the high-gain amplifiers of each of the said plurality of error units has the said one of its input points connected to the said first input point of the error unit, and its output point connected to the respective input point of the said third amplifier of the error unit, by means of a pair of ganged switches which can be opened to interrupt such connections.

15. A computer as claimed in claim 14, wherein at least one of the said plurality of integrators is provided with means for constraining the output signal appearing at its output point to assume a predetermined value or a value within predetermined limits.

16. A computer as claimed in claim 1, wherein at least one of the said plurality of integrators is provided with means for constraining the output signal appearing at its output point to assume a predetermined value or a value within predetermined limits.

References Cited

UNITED STATES PATENTS

| | | | |
|---|---|---|---|
| 3,030,569 | 4/1962 | Chilton | 235—193 X |
| 3,265,866 | 8/1966 | Teiling | 235—193 X |
| 3,267,271 | 8/1966 | Kindle et al. | 235—193 |

MALCOLM A. MORRISON, *Primary Examiner.*

J. F. RUGGIERO, *Assistant Examiner.*

U.S. Cl. X.R.

235—184